(12) United States Patent
Smith (10) Patent No.: US 11,185,805 B2
(45) Date of Patent: Nov. 30, 2021

(54) FILTER ATTACHMENT

(71) Applicant: Sawyer Products, Inc., Safety Harbor, FL (US)

(72) Inventor: John T. Smith, Dunedin, FL (US)

(73) Assignee: Sawyer Products, Inc., Safety Harbor, FL (US)

(*) Notice: Subject to any disclaimer, the term of this patent is extended or adjusted under 35 U.S.C. 154(b) by 36 days.

(21) Appl. No.: 16/809,833

(22) Filed: Mar. 5, 2020

(65) Prior Publication Data

US 2021/0275946 A1  Sep. 9, 2021

(51) Int. Cl.
*B01D 29/13* (2006.01)
*B01D 35/30* (2006.01)
*B01D 35/04* (2006.01)

(52) U.S. Cl.
CPC ........... *B01D 35/306* (2013.01); *B01D 29/13* (2013.01); *B01D 35/043* (2013.01); *B01D 35/046* (2013.01); *B01D 2201/20* (2013.01); *B01D 2201/291* (2013.01); *B01D 2201/4092* (2013.01)

(58) Field of Classification Search
CPC .... B01D 35/306; B01D 35/043; B01D 29/13; B01D 35/046; B01D 2201/291; B01D 2201/4092; B01D 2201/20
See application file for complete search history.

(56) References Cited

U.S. PATENT DOCUMENTS

| | | | | |
|---|---|---|---|---|
| 5,122,272 A | * | 6/1992 | Iana | A45F 3/16 210/244 |
| 6,565,743 B1 | * | 5/2003 | Poirier | B65D 51/00 116/284 |
| 7,862,720 B2 | * | 1/2011 | Brown | C02F 1/002 210/335 |
| 10,160,661 B2 | * | 12/2018 | Gregory | C02F 1/002 |
| 2006/0157398 A1 | * | 7/2006 | Nohren, Jr. | B01D 61/18 210/266 |
| 2014/0124471 A1 | * | 5/2014 | Vihorev | B65D 41/02 215/316 |

* cited by examiner

*Primary Examiner* — Waqaas Ali
(74) *Attorney, Agent, or Firm* — Seyfarth Shaw LLP (57) ABSTRACT

Disclosed is a filter attachment that removably couples with a faucet or other vessel. The attachment includes a flexible cover holding the filter on the vessel and that acts as a pressure relief mechanism if the water pressure of the faucet is above a predetermined threshold. Another flexible cover may be located on the opposite side of the attachment to allow reversible use and cleaning by backwashing. The attachment may further include a removable cap on one side that includes a flexible cover and that couples to the remainder of the attachment in a removable manner so as to allow other fitments to couple to the attachment.

14 Claims, 9 Drawing Sheets

FILTER ATTACHMENT

TECHNICAL FIELD OF THE INVENTION

The presently disclosed embodiments relate generally to filter attachments. More particularly, the presently disclosed embodiments relate to filter attachments that quickly and removably attach to a vessel such as a faucet.

BACKGROUND OF THE INVENTION

Faucet water sometimes requires filtering before it can be consumed by a person. Some water sources are located in close proximity to industrial waste or contamination, requiring removal of certain pollutants or contaminants that make their way into the water source. Water sources in developing nations may include water purification technology that lags behind that of more developed countries. Even within developed countries, some emergencies may occur where a "boil water" order is required due to the potentially hazardous nature of the water source. Filters can help make this water potable or cleaner for human consumption.

Existing faucet filters require the removal of the faucet aerator and the screwing of the filter to a separate structure. This process can be timely and cumbersome to the user. Existing faucet filters also lack a secondary component that allows for connection to vessels other than faucets.

SUMMARY OF THE INVENTION

The presently disclosed embodiments relate to a filter attachment that removably couples with the faucet itself rather than requiring the removal of the faucet aerator. For example, the attachment may be pushed over the aerator or the end of the faucet and a flexible cover may hold the filter in place and act as a pressure relief mechanism. The attachment may have a flexible cover on either side to allow the attachment to be reversed and the filter cleaned by way of backwashing. A removable cap may be coupled to one side of the attachment and include the same or a similar flexible cover as the other side, allowing reversibility of the attachment and the versatility of a secondary fitment coupling to the attachment at the area where the cap was previously coupled.

For example, the presently disclosed embodiments include a filter attachment having a first end and a second end opposite the first end. The attachment further includes a filter that filters liquid and that includes a first flexible cover at the first end, the first flexible cover forming a first aperture, a cap removably coupled to the filter and having a second flexible cover at the second end, the second flexible cover forming a second aperture, and a coupling that is one of integral with or coupled to the filter opposite the first flexible cover, the coupling providing a mechanism for coupling the filter to the cap.

The presently disclosed embodiments further include a filter attachment having a first attachment end and a second attachment end opposite the first attachment end. The attachment further includes a filter that filters liquid and that includes a first flexible cover at a first filter end, the first flexible cover forming a first aperture, a coupling that is one of integral with or coupled to the filter at a second filter end opposite the first filter end, and a cap removably coupled to the filter and having a second flexible cover at the second end. The second flexible cover forms a second aperture opposite the first aperture. The first aperture communicates with the second aperture through the filter.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The presently disclosed embodiments relate to a filter attachment that removably couples with a faucet to allow quick filtering of tap water. The attachment may include a flexible cover that holds the filter in place and acts as a pressure relief mechanism if the water pressure of the faucet is above a predetermined threshold. The attachment may have a flexible cover on either side to allow for reversible use of the attachment and cleaning by backwashing. The attachment may include a removable cap on one side that includes one of the covers that removably attaches to the faucet or other vessel, and when removed, allows a different fitment to be coupled to the filter for greater versatility.

Figure 1:
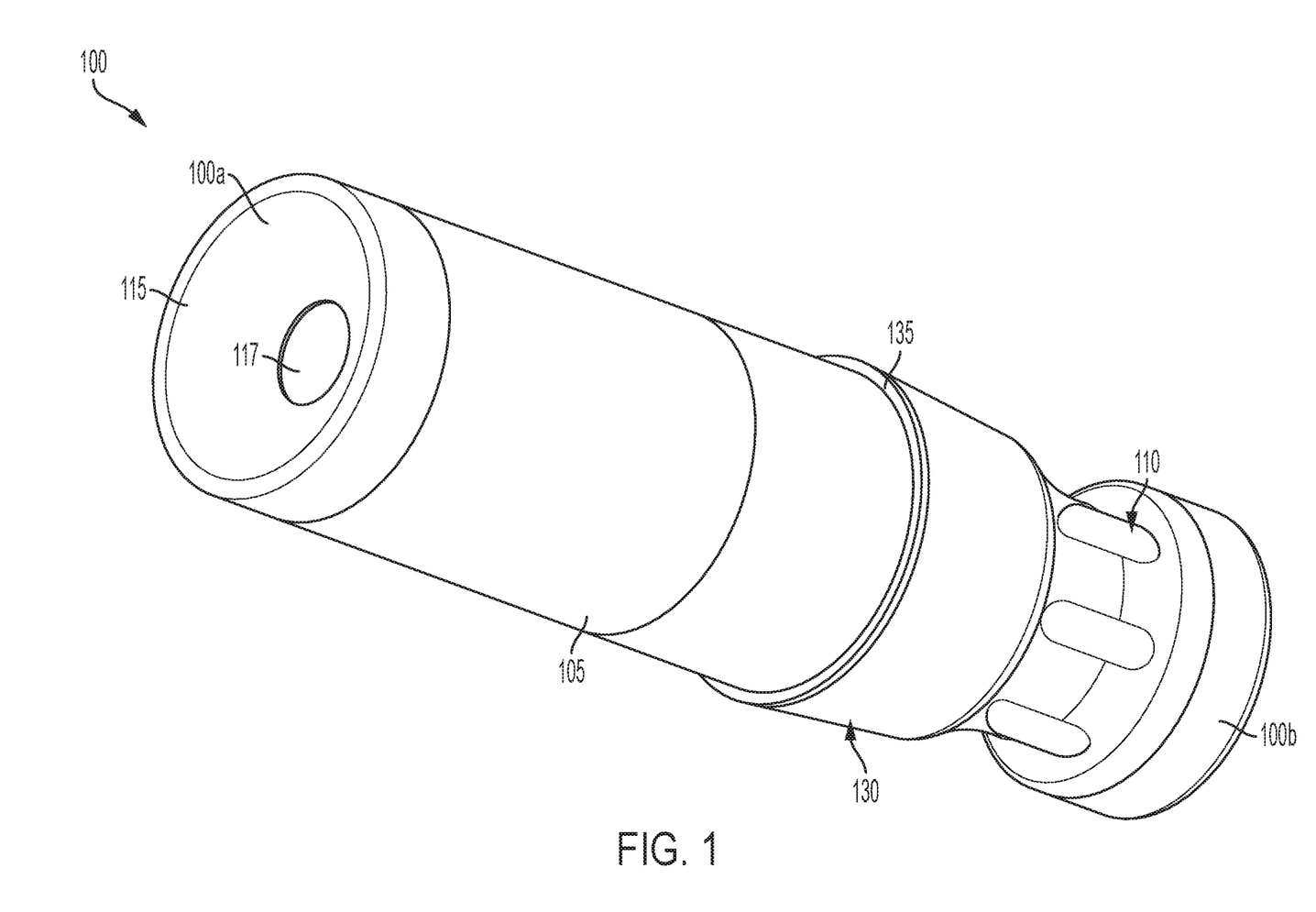
FIG. 1 is a side perspective view of a filter attachment according to at least some of the presently disclosed embodiments.
Figure 2:
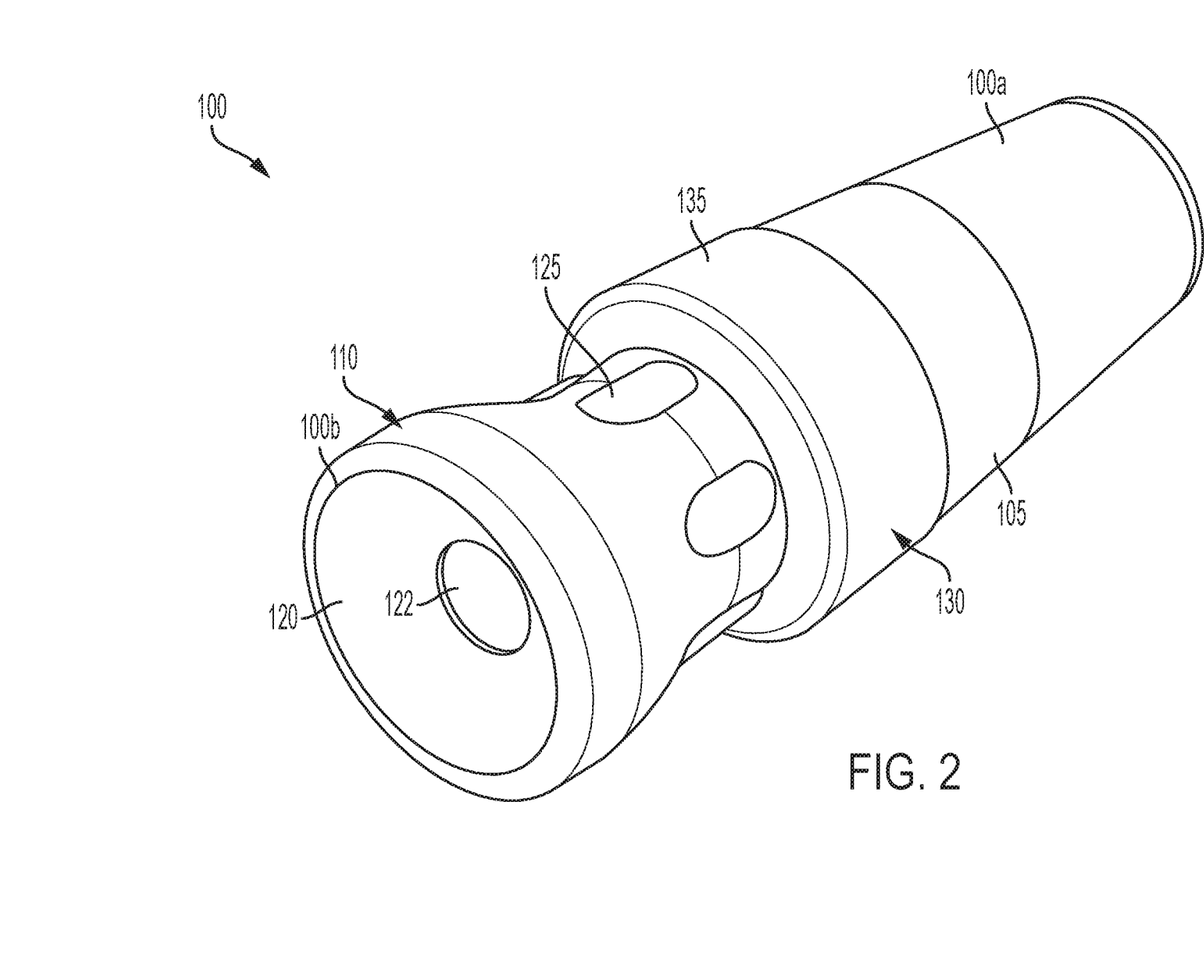
FIG. 2 is a reverse side perspective view of a filter attachment according to at least some of the presently disclosed embodiments.

As shown in FIGS. 1 and 2, a filter attachment 100 can have a first end 100*a* and a second end 100*b* opposite the first end 100*a*. The filter attachment 100 may include a filter 105 coupled to a cap 110. The filter 105 may include a first cover 115 defining a first aperture 117 at the first end 100*a* of the attachment 100, and the cap 110 may include a second cover 120 forming a second aperture 122 at the second end 100*b* of the attachment 100. As discussed below in more detail, the first 115 and second 120 covers can be made of a flexible material that allows for releasable engagement of the attachment with a faucet 100 or other vessel spout by coupling the spout to the attachment 100 via one of the apertures 112, 117.

Figure 3:
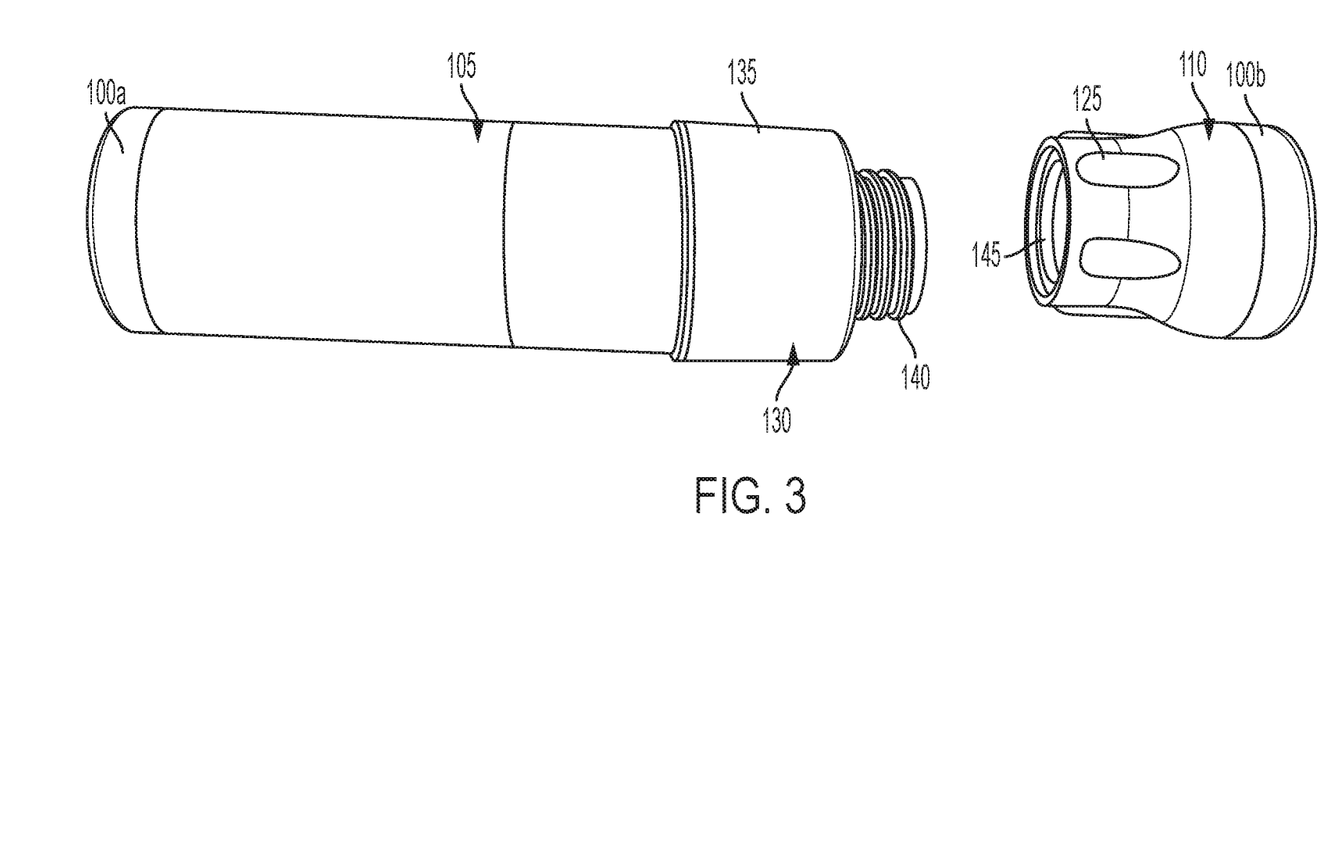
FIG. 3 is a front exploded view of a filter attachment according to at least some of the presently disclosed embodiments.

The cap 110 can include ribs 125 that allow a user to grip the cap 110 and remove the cap 110 from the filter 105. For example, the cap 110 can be coupled to the filter 105 by threads such that the ribs 125 allow the user to rotate the cap 110 and disassemble the cap 110 from the filter 105. The cap 110 can be coupled to a coupling 130 having a collar 135 that is either integral with or coupled to the filter 105. The coupling 130 can include, for example, the corresponding threads for the cap 110 to couple to. However, the cap 110 can be coupled to the filter 105 by other means, such as by Velcro®, friction fit, clips, snaps, buttons, or any other coupling mechanism, without departing from the spirit and scope of the present invention. As shown in FIG. 3, however, in a preferred embodiment, the filter 105 can include male threads and the cap 110 can include female threads, or vice versa.

Figure 4:
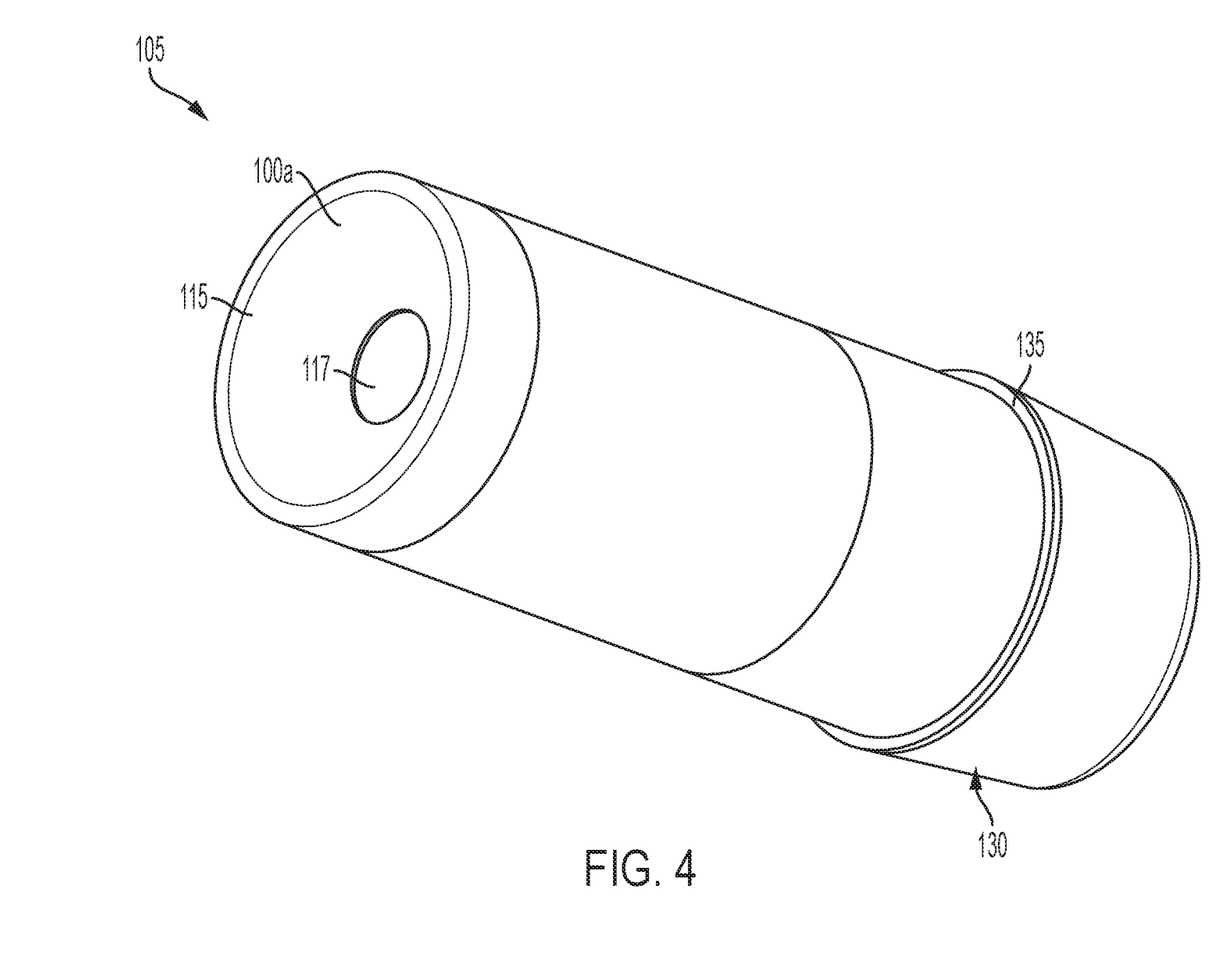
FIG. 4 is a side perspective view of a filter according to at least some of the presently disclosed embodiments.
Figure 5:
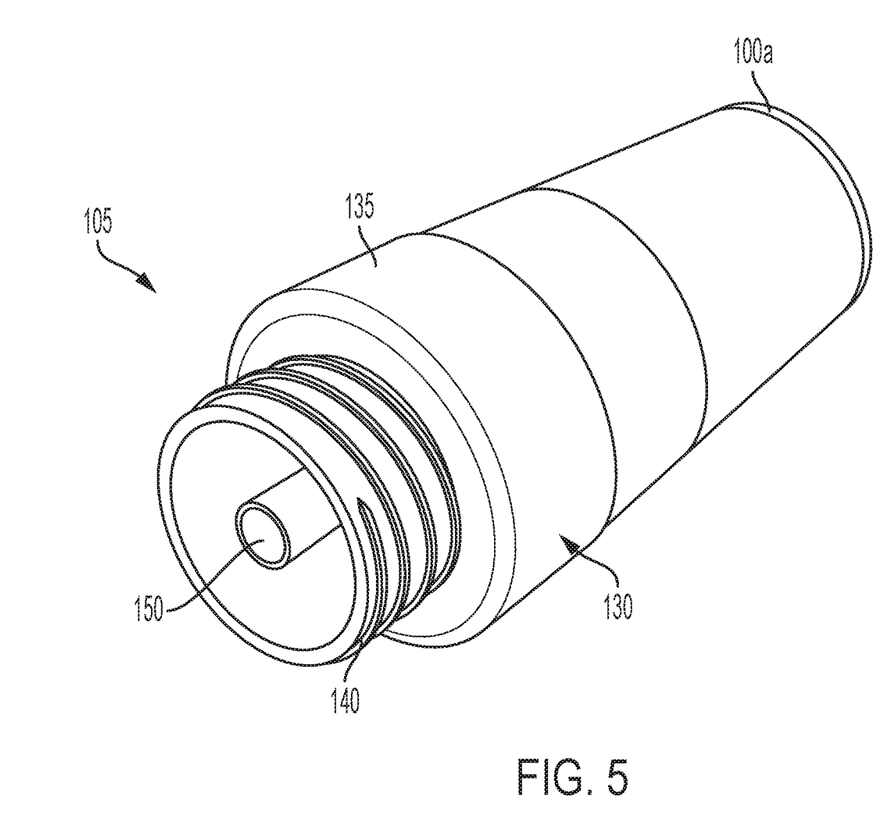
FIG. 5 is a reverse side perspective view of a filter according to at least some of the presently disclosed embodiments.
Figure 6:
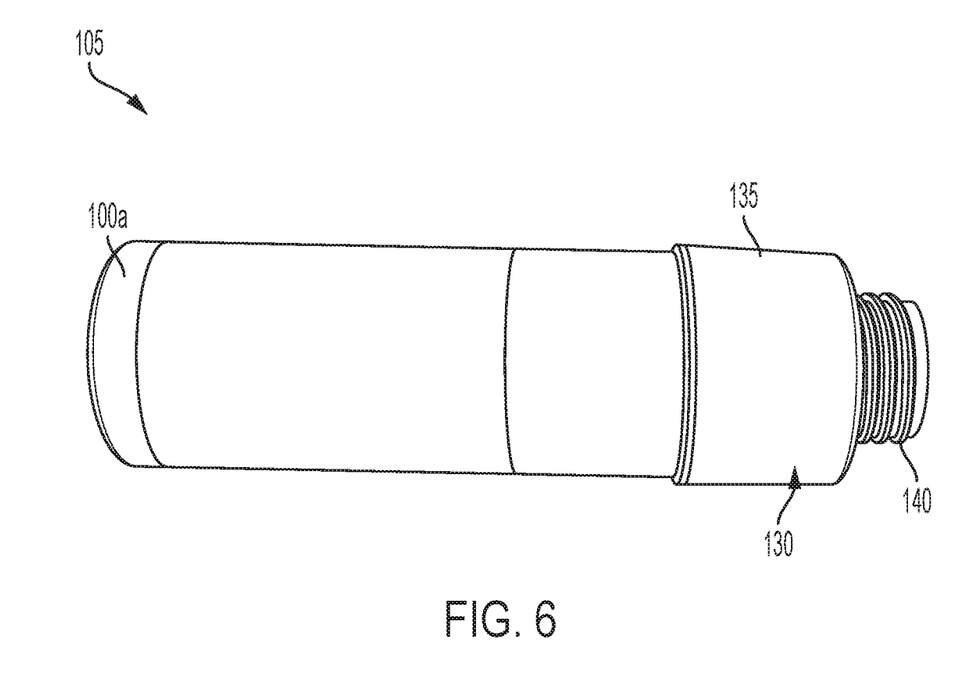
FIG. 6 is a front view of a filter according to at least some of the presently disclosed embodiments.

FIG. 4 is a side perspective view, FIG. 5 is a reverse side perspective view, and FIG. 6 is a front view of the filter 105 according to at least some of the presently disclosed embodiments. As shown, the filter 105 extends from the first side 100*a* of the attachment 100 to the coupling 130 in an axial direction. The housing of the filter 105 can be a circular cross-section, as shown, or can be any other shape without departing from the spirit and scope of the present invention.

The filter 105 can include a spout 150 extending axially towards the first aperture 120 and connecting the inside of the filter 105 with the first aperture 120. In so doing, the spout 150 can direct water or other liquid from the faucet or other vessel towards the exterior of the attachment and into a cup, glass, or other container for consumption by a human. In this example, the attachment 100 would be coupled to the vessel at the second cover 120 and water or other liquid would proceed through the attachment from the second end 100*b* to the first end 100*a*.

Figure 7:
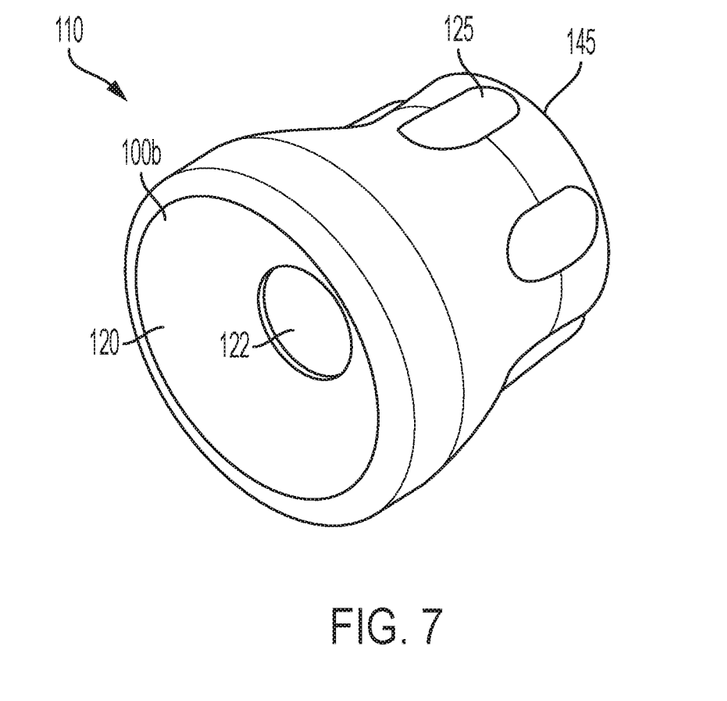
FIG. 7 is a side perspective view of a cap according to at least some of the presently disclosed embodiments.
Figure 8:
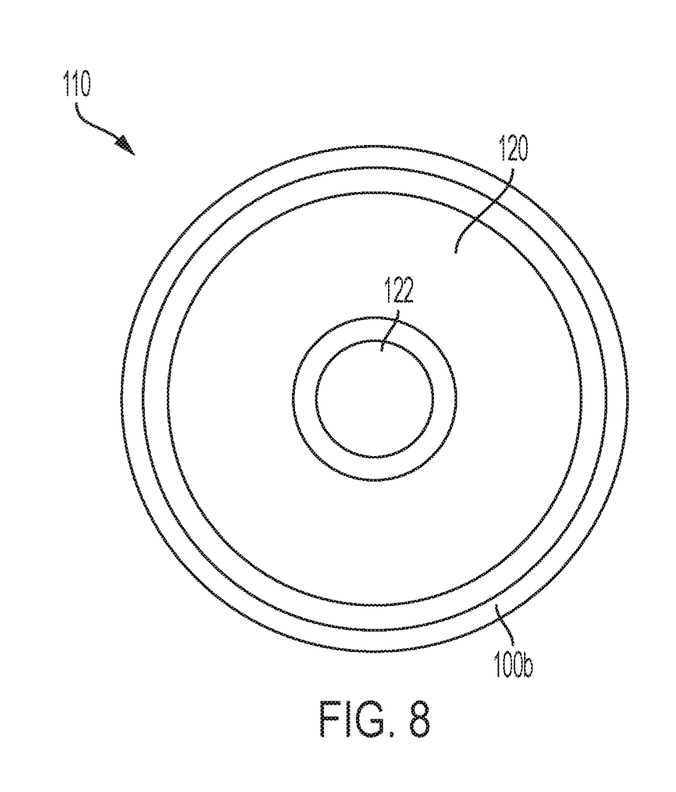
FIG. 8 is a side view of a cap according to at least some of the presently disclosed embodiments.
Figure 9:
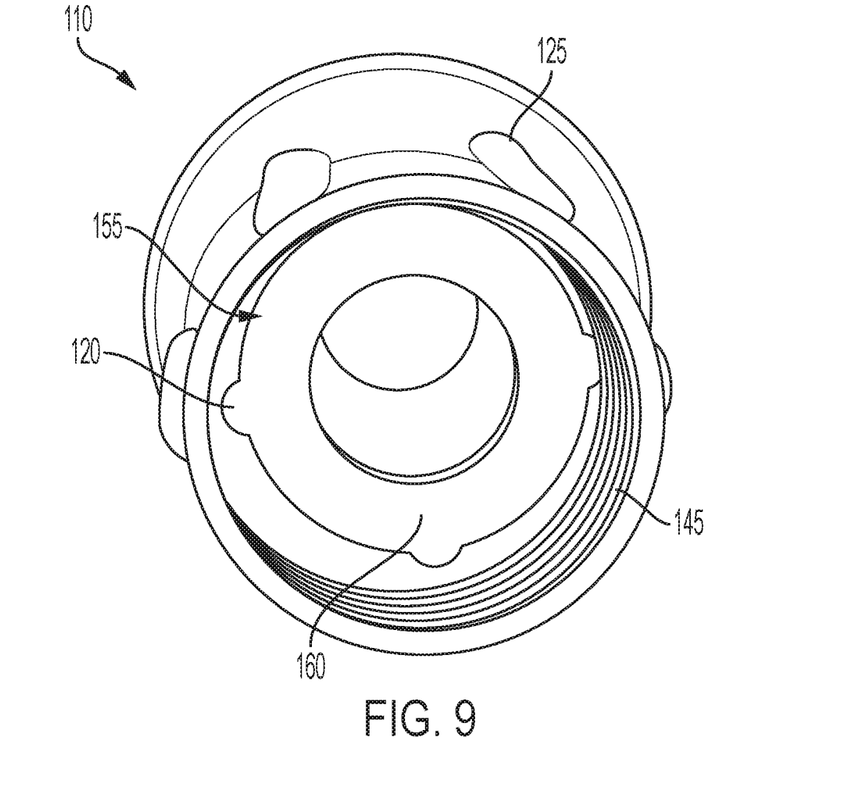
FIG. 9 is a reverse side view of a cap according to at least some of the presently disclosed embodiments.

FIG. 7 is a side perspective view, FIG. 8 is a side view, and FIG. 9 is a reverse side view of the cap 110 according to at least some of the presently disclosed embodiments. As shown, the cap 110 begins at the second side 100*b* of the attachment 100 and includes the second cover 120 forming the second aperture 122. The cap 110 extends axially and terminates at the female threads 145 or any other end point. As shown, the cap 110 is predominantly cylindrical so as to allow for easy threadable coupling, but the present invention is not so limited and the cap 110 can be any shape that allows for coupling to the filter 105 without departing from the spirit and scope of the present invention.

As shown in FIG. 9, the cap 110 can include a ring 150 with tabs 155 that couple the ring 150 to the cap 100. The ring 150 can generally form a barrier against which the male threads 140 contact when the filter 105 and cap 110 are fully assembled. The ring 150 can also act as a flow regulator to prevent excessive flow of water or other liquid when entering or exiting the filter attachment 100.

As shown, the covers 115, 120 can be flexible covers that allow for quick and releasable attachment to a faucet or other spout. For example, a user can align either of the apertures 117, 122 with the spout and insert the attachment 100 into the spout. Liquid can then flow through the attachment 100 and be filtered by media or other matter within the filter 105. Water can then exit through the opposite side 100*a*, 100*b* than the side 100*b*, 100*a* that it entered from.

The covers 115, 120 can be flexible in any manner. For example, the covers 115, 120 can be made of a material with a lower modulus of elasticity as compared to that of the filter 105 or cap 110. The covers 115, 120 can be made of rubber or a polymeric substance that allows greater flexing and returning to form upon being inserted onto a spout or faucet. Any other material or mode of flexibility can be implemented without departing from the spirit and scope of the present invention.

The flexibility of the covers 115, 120 allows for several advantages. For example, the covers 115, 120 can act as pressure relief mechanisms in the event that the liquid flows out of the spout at an excessive flow rate. Pressure above a predetermined threshold would apply a force against the flexible covers 115, 120 and would push the attachment 100 off the spout to avoid damaging the spout due to the flexibility of the covers 115, 120. The threshold pressure would be dependent on the modulus of elasticity of the covers 115, 120 and can be custom-configured during manufacturing to meet a specific threshold by selecting the proper material for the covers 115, 120. In an embodiment, the covers 115, 120 need not be made of the same material or have the same modulus of elasticity, and instead the covers 115, 120 can be made of different materials so as to allow for a different pressure threshold depending on whether the first cover 115 or second cover 120 is inserted onto the faucet or spout.

The covers 115, 120 can also allow for greater versatility of the attachment 100. For example, the covers 115, 120 can be located on both sides 100*a*, 100*b* of the attachment 100 and can therefore be coupled to the spout on either side 100*a*, 100*b*. In so doing, the user can remove and reverse the attachment 100 and clean the filter 105 by backwashing water through the filter 105 and removing some of the particles captured therein. The attachment 100 can therefore be used much longer, with proper maintenance, as compared to conventional filters.

The coupling 130 of the filter 105 also allows for greater versatility of the attachment by allowing different fitments to be coupled thereto. For example, and as shown, the cap 110 can be coupled to the coupling 130 and allow for reversible use of the attachment 100 or cleaning of the filter 105. However, the coupling 130 can further couple to a faucet, spout, hose, or other object through the male threads 140 or through any other coupling mechanism located at the coupling 130.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A filter attachment having a first end and a second end opposite the first end, the filter attachment comprising:
    a filter that filters liquid and that includes a first flexible cover at the first end, the first flexible cover forming a first aperture extending through the first flexible cover, the first flexible cover having a lower modulus of elasticity as compared to the filter;
    a cap removably coupled to the filter and having a second flexible cover at the second end, the second flexible cover forming a second aperture extending through the second flexible cover, the second flexible cover having a lower modulus of elasticity as compared to the filter; and
    a coupling that is one of integral with or coupled to the filter opposite the first flexible cover, the coupling providing a mechanism for coupling the filter to the cap.

2. The filter attachment of claim 1, wherein the cap includes ribs extending axially thereon.

3. The filter attachment of claim 1, wherein the coupling includes coupling threads and the cap includes cap threads, and wherein the coupling threads engage with the cap threads to couple the cap to the filter.

4. The filter attachment of claim 3, wherein the coupling threads are male threads, and wherein the cap threads are female threads.

5. The filter attachment of claim 3, wherein the coupling threads are female threads, and wherein the cap threads are male threads.

6. The filter attachment of claim 3, wherein the coupling has a collar leading to the coupling threads.

7. The filter attachment of claim 1, further comprising a spout extending axially from the filter and communicating an area inside the filter with an area outside of the filter attachment.

8. A filter attachment having a first attachment end and a second attachment end opposite the first attachment end, the filter attachment comprising:
    a filter that filters liquid and that includes a first flexible cover at a first filter end, the first flexible cover forming a first aperture extending through the first flexible cover, the first flexible cover having a lower modulus of elasticity as compared to the filter;
    a coupling that is one of integral with or coupled to the filter at a second filter end opposite the first filter end; and
    a cap removably coupled to the filter and having a second flexible cover at the second end, the second flexible cover forming a second aperture extending through the second flexible cover, the second flexible cover having a lower modulus of elasticity as compared to the filter,
    wherein the first aperture communicates with the second aperture through the filter.

9. The filter attachment of claim 8, wherein the cap includes ribs extending axially thereon.

10. The filter attachment of claim 8, wherein the coupling includes coupling threads and the cap includes cap threads, and wherein the coupling threads engage with the cap threads to couple the cap to the filter.

11. The filter attachment of claim 10, wherein the coupling threads are male threads, and wherein the cap threads are female threads.

12. The filter attachment of claim 10, wherein the coupling threads are female threads, and wherein the cap threads are male threads.

13. The filter attachment of claim 10, wherein the coupling has a collar leading to the coupling threads.

14. The filter attachment of claim 8, further comprising a spout extending axially from the filter and communicating an area inside the filter with an area outside of the filter attachment.

* * * * *